Feb. 26, 1929.
H. M. DENYES
1,703,301
STEERING GEAR ASSEMBLY
Filed Aug. 3, 1925
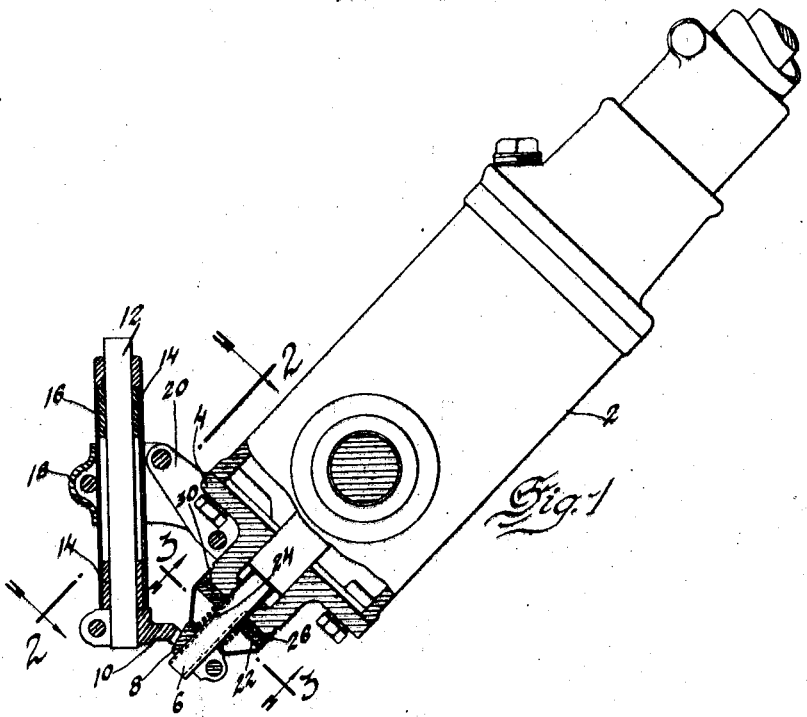
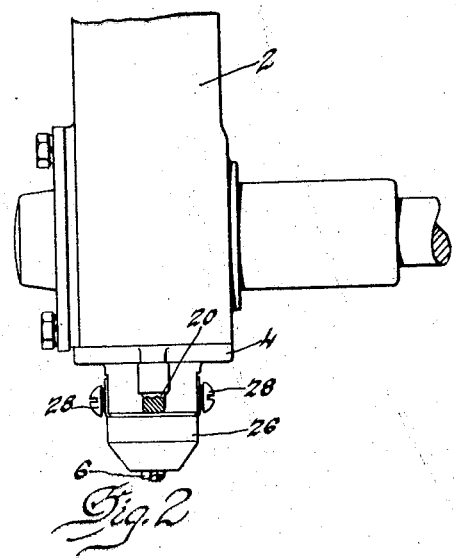
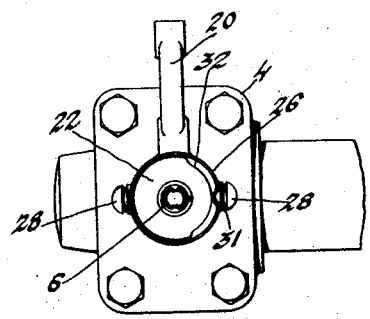
Inventor
Harry M. Denyes
By Blackmore, Spencer & Fluit
Attorney Patented Feb. 26, 1929.

1,703,301

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING-GEAR ASSEMBLY.

Application filed August 3, 1925. Serial No. 47,811.

I have herein disclosed certain improvements in steering gear, these improvements relating, first, to a manner of mounting certain of the auxiliary devices operated from one of the nested shafts constituting the assembly and, second, to a friction device associated with said shaft for holding it in adjusted position.

The first improvement consists essentially in mounting upon the cap which closes the lower end of the steering gear housing a rock shaft operated from one of the nested shafts of the gear so that these parts may be assembled as a unit prior to mounting on the frame. The second improvement consists, specifically, in providing a pair of cooperating spring pressed friction members one of which is carried by the nested shaft previously referred to, these members preferably encircling the lower end of the shaft and cooperating to hold the latter in any position of rotary adjustment.

Other objects and advantages will appear from the accompanying drawing taken in connection with the following specification, the novel features being specifically pointed out in the claims appended hereto.

In the drawing:

Figure 1 is a side elevation of the lower portion of a steering column, the parts embodying my invention being shown in section;

Figure 2 is a section on line 2—2 of Figure 1; and

Figure 3 is a section on line 3—3 of Figure 1.

The reference character 2 indicates a casing member which serves to inclose certain of the mechanism of the steering gear. The lower end of this casing member is closed by a cap 4 and one of the nested shafts comprising the steering gear assembly is shown projecting through the casing member 2 and the cap 4 and is indicated by the reference character 6. The shaft 6 is provided at its lower end with a segmental gear 8 meshing with a corresponding gear 10 provided on the rock shaft 12 which is mounted in bearings 14 provided in casing 16, the casing being encircled by the strap member 18 clamped to arm 20 projecting from the cap 4. By this arrangement the rock shaft may be separately assembled with the cap 4 and applied to the casing member 2, whereupon the complete assembly may be mounted upon the frame, thus avoiding the necessity of a separate mounting for the rock shaft. Between the gear segment 8 and the cap 4 is arranged the friction device constituting the second feature of my invention. This device comprises a friction disk 22 keyed to the shaft 6 and pressed toward the member 4 by a spring 24 surrounding the shaft and preferably bearing against inwardly turned flanges formed upon the housing member or hanger 26 which may be secured to the cap 4 as by screw bolts 28. In order to secure the requisite amount of friction a disk 30 of friction material, such as leather, may be arranged between the disk 22 and the cap 4. The disk 30 may be secured either to the disk 22 or to the cap as desired.

A portion of the material of the casing 26 is preferably pressed inwardly as at 31 engaging a segmental notch 32 formed in the disk 22 to thereby limit the extent of movement of the shaft.

While in the steering gear as actually constructed the shaft 6 and rock shaft 12 serve for the operation of the usual throttle valve, it is obvious that they may operate any other desired mechanism. It is also apparent that the friction device may be applied to any other of the shafts comprising the steering gear assembly and may be applied at the top as well as at the bottom of the steering column.

I claim:

1. In a steering gear assembly, a housing, an operating shaft projecting through the housing, and means surrounding the lower end of the shaft and operating between the shaft and the housing for holding the shaft in adjusted position, said means comprising a friction disk mounted on said shaft for rotation therewith, a cooperating friction member associated with said housing, and a spring surrounding said shaft and yieldingly forcing said disk into engagement with said member.

2. In a steering gear assembly, a housing, an operating shaft projecting through the housing, a friction disk mounted on said shaft for rotation therewith, a cooperating friction member associated with said housing, a spring surrounding the shaft and yieldingly forcing said disk into engagement with said member, and a casing mounted on said housing and enclosing said friction devices.

3. In the structure as defined in claim 2, said housing enclosing said spring and receiving the thrust thereof.

4. In the structure as defined by claim 2, said housing and disk having cooperating parts for limiting the amount of rotation of the disk.

5. In a steering gear assembly, the combination of a housing member, a control shaft housed in said member and projecting downwardly therethrough, a disk non-rotatably mounted on said shaft, resilient means associated with said disk, and cooperating friction surfaces on said housing and the face of said disk for holding said shaft in adjusted position.

6. In a steering gear assembly, the combination of a housing member, a control shaft housed in said member and projecting downwardly therethrough, an element splined on the lower end of said shaft, cooperating friction surfaces on said element and housing for holding said shaft and housing in adjusted position, and means connected with said element for taking up the wear on said friction surfaces.

7. In combination with a steering post, a control tube extending through the post, means on the upper end of the control tube for turning the same, operating means attached to the lower end of the control tube, friction means on the lower end of the tube for holding it in adjusted position, said means including a friction element and a spring surrounding the tube and urging the element into frictional engagement.

8. In combination with a steering post, a control tube extending through the post, means on the upper end of the control tube for turning the same; operating means attached to the lower end of the control tube; a hanger attached to the post below the tube; frictional means for holding the lever and a spring for holding said means in frictional contact, said frictional means and spring being concentric with the tube and said hanger holding the frictional means and spring in operative position.

In testimony whereof I affix my signature.

HARRY M. DENYES.